J. A. SHARP.
CLUTCH.
APPLICATION FILED MAR. 1, 1909.
925,957.
Patented June 22, 1909.
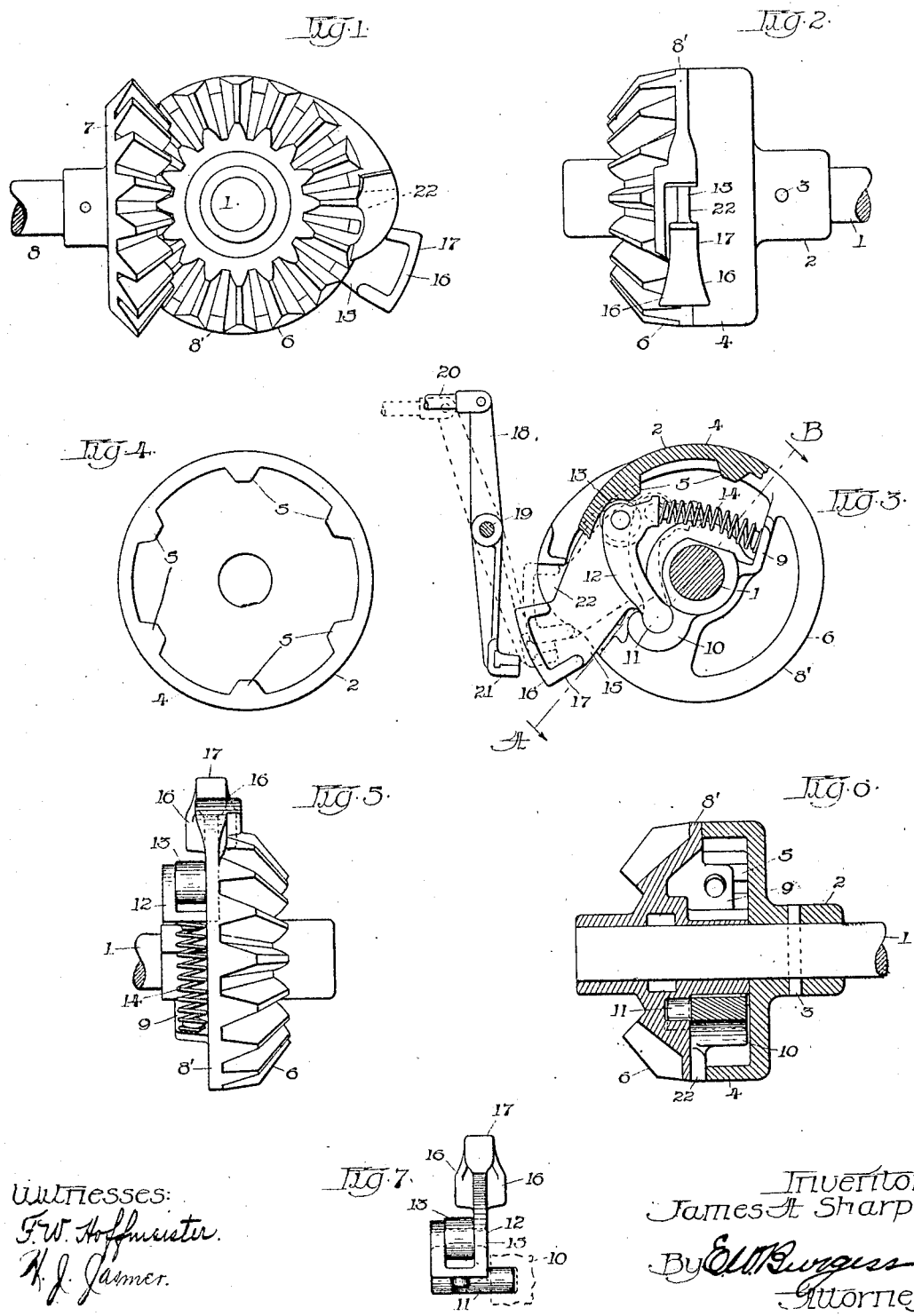
Witnesses:
F. W. Hofmeister.
H. J. Jasmer.
Inventor:
James A. Sharp.
By E. W. Burgess
Attorney.

UNITED STATES PATENT OFFICE.

JAMES A. SHARP, OF SPRINGFIELD, OHIO, ASSIGNOR TO INTERNATIONAL HARVESTER COMPANY, A CORPORATION OF NEW JERSEY.

CLUTCH.

No. 925,957.　　　　　Specification of Letters Patent.　　　　　Patented June 22, 1909.

Application filed March 1, 1909. Serial No. 480,502.

*To all whom it may concern:*

Be it known that I, JAMES A. SHARP, a citizen of the United States, residing at Springfield, in the county of Clark and State of Ohio, have invented certain new and useful Improvements in Clutches, of which the following is a specification.

My invention relates to clutches of the locking pawl type, and is designed particularly for use in connection with power transmitting mechanism for automatic grain binders.

It consists in an improved form of locking pawl, novel means for mounting and controlling the operation of the pawl, and in an improved manner of constructing the other associated parts of the clutch mechanism whereby they are housed in a manner to protect them from any accumulation of matter that would cause disengagement and consequent ineffectiveness of operation; the object of my invention being to provide a clutch mechanism simple in construction and strong and durable in operation. I attain these objects by means of the mechanism illustrated in the accompanying drawing, in which—

Figure 1 represents a view of two intermeshing gears, one of them forming part of my improved clutch mechanism; Fig. 2 is a side view of a power transmitting shaft, having one of the clutch members secured thereto and a complemental clutch and gear member loosely mounted thereon; Fig. 3 is a plan view, partly in section, designed to illustrate the operative relation of the associated parts of the clutch mechanism; Fig. 4 is a plan view of the fixed clutch member, showing the manner of constructing its toothed element; Fig. 5 is a side elevation of a power transmitting shaft having the loose member of the clutch mechanism mounted thereon; Fig. 6 is a cross section of Fig. 3 on the line A—B; and Fig. 7 is a detail drawing of the locking pawl.

The same reference characters designate like parts throughout the several views.

1 represents a power transmitting shaft having a clutch member 2 secured thereto by means of pin 3; the clutch member being provided with a rim portion 4 having a series of clutch teeth 5 upon its internal surface.

6 represents a bevel pinion and complemental clutch member loosely mounted upon the shaft adjacent said fixed member and adapted to engage in an operative manner with a pinion 7 secured to a shaft 8 arranged at right angles with shaft 1. The pinion 6 is provided upon its inner side with an annular web portion 8¹ that fits closely against the adjacent edge of the rim 4, and 9 represents a wing portion projecting laterally from the web portion of the pinion and within the rim 4, the wing extending upon the opposite sides of the hub of the pinion and provided at one side thereof with a semi-circular socket 10 which is arranged parallel with the axis of the pinion and adapted to receive in a rocking manner a heel portion 11 of a pawl 12 that is provided at its front end with a roller 13 journaled upon a pin arranged parallel with the axis of the pinion; the roller being adapted to engage with the clutch teeth 5 when the pawl is rocked in one direction upon its heel, and to be disengaged therefrom when rocked in an opposite direction; and 14 represents a coil spring having one end abutting against the wing 9 and its opposite end against the pawl and operative to move the latter into engagement with the teeth 5 when its action is unopposed. The pawl 12 is provided with an outwardly extending wing 15 that projects beyond the periphery of the pinion 6 and is provided with laterally projecting rib portions 16 upon opposite sides thereof that form an enlarged head portion 17, having a radially arranged face adapted to engage with a clutch controlling lever 18 pivotally mounted upon a fixed pivot 19 intermediate its ends and connected at one end with an operating rod 20 and having its opposite end provided with a hook portion 21 adapted to be thrown within the path of movement of the head portion of the pawl in a manner to engage therewith and become operative to rock the pawl upon its heel in a direction to release the roller from engagement with the teeth of the fixed clutch member at predetermined intervals in a common way. The pinion 6 is provided with a gap portion 22 in its web portion that is adapted to receive the wing portion 15 of the pawl, the gap permitting the pawl to rock about its heel in an operative manner.

The rear wall of the gap is arranged in a manner to contact with the rear portion of the head of the wing portion of the pawl when it is released from engagement with the clutch teeth by means of the controlling lever, and the impact of the pinion 6, as it is suddenly brought to a state of rest, is received thereby in a manner that obviates the danger of breaking the pawl, as is frequently the case when the impact of the moving part is received by the pawl at a point near its axis of movement.

What I claim as my invention, and desire to secure by Letters Patent, is:

1. A clutch mechanism including, in combination, a driving shaft, a clutch member secured to said driving shaft and provided with a laterally extending rim portion having clutch teeth upon its internal surface, a complemental clutch member loosely mounted upon said driving shaft and provided with an annular web portion fitting closely against said rim, a pinion forming part of said complemental member, a socket arranged thereon and parallel with the axis thereof, a pawl having a heel portion at one end thereof, said heel portion being received by said socket, a roller at the opposite end of said pawl and adapted to engage with said clutch teeth, a spring operative to move said pawl into engagement with said teeth, said pawl having an outwardly extending wing projecting beyond the periphery of said pinion, and clutch disengaging means adapted to engage with said wing.

2. A clutch mechanism including, in combination, a driving shaft, a clutch member secured to said driving shaft and provided with a laterally extending rim portion having clutch teeth upon its internal surface, a complemental clutch member loosely mounted upon said driving shaft and provided with an annular web portion fitting closely against said rim, a pinion forming part of said complemental member, a socket arranged thereon and parallel with the axis thereof, a pawl having a heel portion at one end thereof, said heel portion being received by said socket, a roller at the opposite end of said pawl and adapted to engage with said clutch teeth, a spring operative to move said pawl into engagement with said teeth, the annular web portion of said complemental clutch member having a gap therein, said pawl having a wing portion extending outward through said gap, and clutch disengaging means adapted to engage with said wing.

3. A clutch mechanism including, in combination, a driving shaft, a clutch member secured to said driving shaft and provided with a laterally extending rim portion having clutch teeth upon its internal surface, a complemental clutch member loosely mounted upon said driving shaft and provided with an annular web portion fitting closely against said rim, a pinion forming part of said complemental member, a socket arranged thereon, a pawl having a heel portion at one end thereof, said heel portion being received by said socket, a roller at the opposite end of said pawl and adapted to engage with said clutch teeth, a spring operative to move said pawl into engagement with said teeth, the annular web portion of said complemental clutch member having a gap therein, said pawl having a wing portion extending outward through said gap, and clutch disengaging means adapted to engage with said wing, said wing contacting with the rear wall of said gap when the pawl is disengaged.

JAMES A. SHARP.

Witnesses:
W. B. KENDIG,
FRANK C. MILLER.